Apr. 24, 1923.

H. W. WHITE ET AL

END GATE

Filed April 17, 1922

Howard W. White
William Lininger
INVENTOR

BY

ATTORNEY

WITNESS:

Apr. 24, 1923. 1,453,219
H. W. WHITE ET AL
END GATE
Filed April 17, 1922 2 Sheets-Sheet 2

Howard W. White
William Lininger
INVENTOR

BY Victor J. Evans
ATTORNEY

WITNESS:

Patented Apr. 24, 1923.

1,453,219

UNITED STATES PATENT OFFICE.

HOWARD W. WHITE AND WILLIAM LININGER, OF KENT, IOWA.

END GATE.

Application filed April 17, 1922. Serial No. 553,349.

*To all whom it may concern:*

Be it known that we, HOWARD W. WHITE and WILLIAM LININGER, citizens of the United States, residing at Kent, in the county of Union and State of Iowa, have invented new and useful Improvements in End Gates, of which the following is a specification.

This invention relates to improvements in end gates for dump carts, wagons, trucks and similar vehicles.

An object of the present invention is the provision of means for adjusting and holding the gate in any desired adjusted position, whereby the gate in addition to being held closed, may be held open at any desired angle.

With the above and other objects in view, the invention further includes the following novel features and details of construction, to be hereinafter more fully described, illustrated in the accompanying drawings and pointed out in the appended claims.

In the drawings:—

Figure 1:
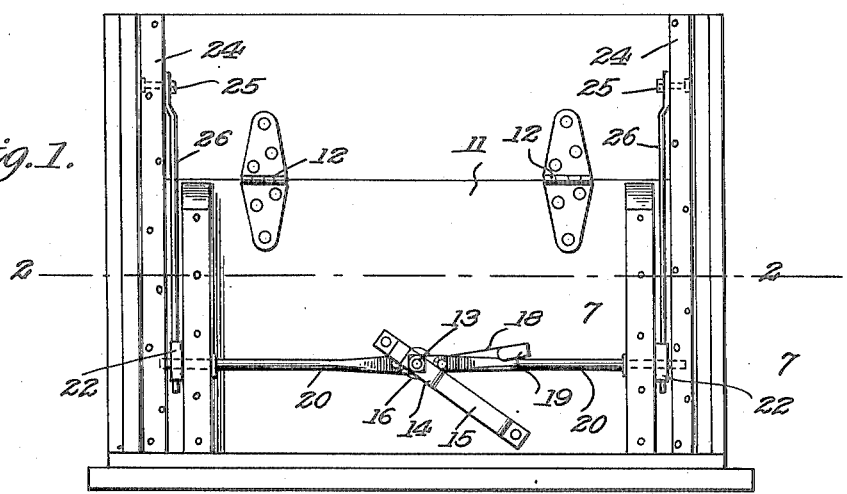
Figure 1 is a rear elevation of a wagon or truck with the invention applied.
Figure 2:
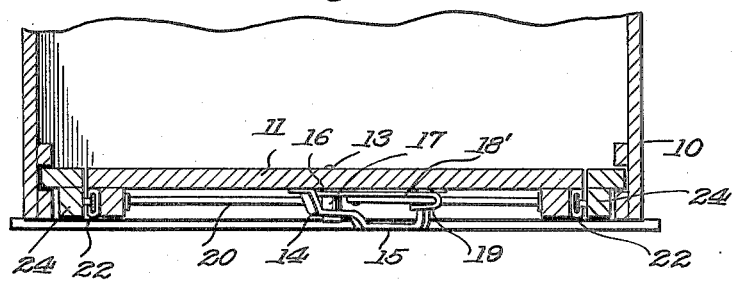
Figure 2 is a horizontal sectional view of the same.
Figure 3:
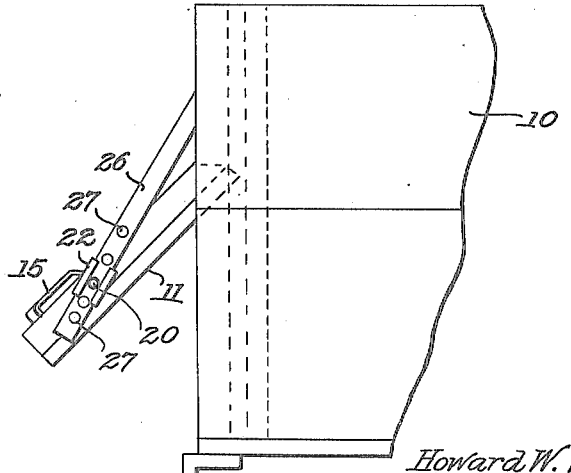
Figure 3 is a side elevation showing the rear end of a dump cart or wagon with the end gate partly open.
Figure 4:
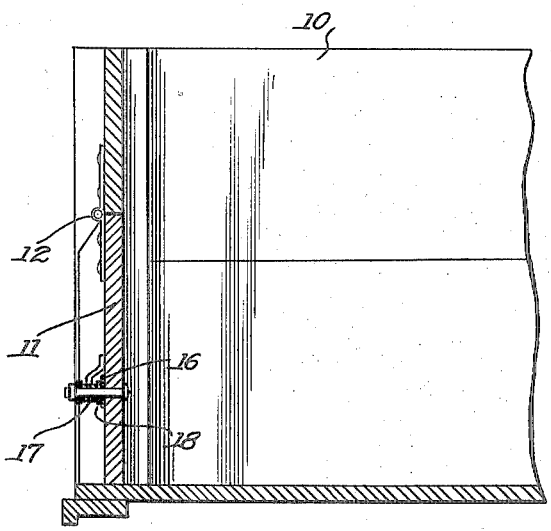
Figure 4 is a central vertical sectional view taken transversely through the end gate.
Figure 5:
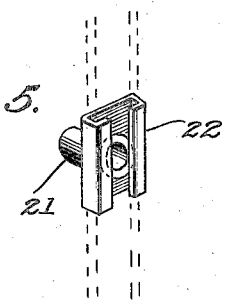
Figure 5 is a detail perspective view of one of the sleeves and the channeled guide carried thereby.
Figure 6:
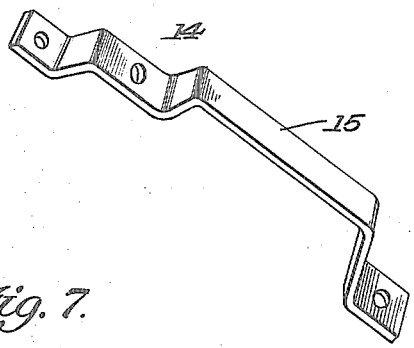
Figure 6 is a similar view of the combined bearing bracket and handle.
Figure 7:
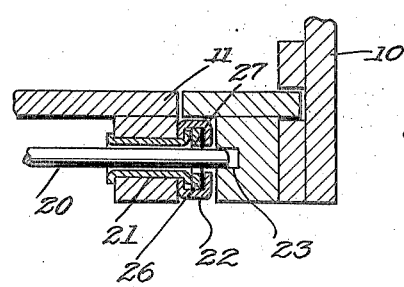
Figure 7 is an enlarged fragmentary horizontal section taken on a line with one of the locking rods.

Referring in detail to the drawings, wherein like characters of reference denote corresponding parts, the reference character 10 indicates a portion of the body of a vehicle having an end gate 11 which is hingedly connected thereto along its upper edge as shown at 12. Extending through the gate 11 is a pivot bolt 13 and one end of this bolt extends through a bracket 14, the said bracket being extended to provide a handle or grip 15, having its opposite ends connected to the end gate. The bracket is thus made to serve both as a bearing or support for the outer end of the pivot bolt 13 and as a handle for convenience in opening and closing the end gate.

Mounted upon the pivot bolt 13 between a washer 16 and a sleeve 17, is an operating lever 18, one end of which is bent to provide a handle 19. Pivotally secured to the operating lever 18 upon opposite sides of the pivot bolt 13 are the inner ends of rods 20. These rods are slidable through guide sleeves 21 which extend through cleats provided at each side edge of the end gate 11. The outer ends of these sleeves have mounted thereon channel-shaped guides 22, the outer ends of the sleeves being upset or turned over so that the guides 22 will be swiveled upon the sleeves between this upset portion and the cleats of the end gate. The rods 20 may thus be projected through the sleeves 21 and guides 22 so as to engage sockets 23 provided in the body 10 of the vehicle and when so engaged, the end gate will be held in closed position.

Pivotally secured to the standards 24, or other convenient portion of the body 10 as shown at 25, are the upper ends of bars 26. These bars are provided with openings 27 and are adapted to be received within the channel-shaped guides 22 and as the latter are permitted a pivotal movement upon the sleeves 21, the end gate 11 may be swung upon its hinges with the bars 26 sliding within the guides. The openings 27 of these guides may thus be brought into register with the bore of the sleeves, so that the rods 20 may be projected through these openings and the gate held open at any desired angle. The rods 20 also pass through openings in the bars 26 when the gate is closed and aid in holding the gate in this position.

The invention is susceptible of various changes in its form, proportions and minor details of construction and the right is herein reserved to make such changes as properly fall within the scope of the appended claims.

Having described the invention what is claimed is:—

1. The combination with a vehicle body having an end gate, of bars pivotally secured to the vehicle body at each side of the gate, guides carried by the gate and slidingly engaging the bars and means operatively mounted upon the gate for engagement in openings provided in said bars to hold the gate in adjusted position.

2. The combination with a vehicle body having an end gate, of bars pivotally secured to the vehicle body at each side of the gate, guides carried by the gate and slidingly engaging the bars and means operatively mounted upon the gate and movable through the bar guiding means for engagement in openings provided in the bars to hold the gate in adjusted position.

3. The combination with a vehicle body having an end gate, of bars pivotally secured to the vehicle body at each side of the gate and having openings therein, channel shaped guides swiveled upon each side of the gate to receive the bars and means operatively mounted upon the gate for engagement in the openings of the bars to hold the gate in adjusted position.

4. The combination with a vehicle having an end gate, of bars pivotally secured to the vehicle body at each side of the gate and having openings therein, sleeves located at each side of the gate, channel-shaped guides pivotally mounted upon the outer ends of the sleeves to receive the bars and means including locking rods movable longitudinally through the sleeves for engagement in the openings of the bars to hold the gate in adjusted position.

In testimony whereof we affix our signatures.

HOWARD W. WHITE.
WILLIAM LININGER.